Patented May 10, 1949

2,469,847

UNITED STATES PATENT OFFICE

2,469,847

PROCESS FOR PRODUCING FILAMENTARY REACTION PRODUCTS OF RUBBERY POLYMERS WITH SULFUR DIOXIDE

Gottfried Ernst Rumscheidt and Willem Leendert Johannes de Nie, Amsterdam, Netherlands, assignors to Shell Development Company, San Francisco, Calif., a corporation of Delaware No Drawing. Application July 14, 1947, Serial No. 760,924. In the Netherlands December 23, 1941

Section 1, Public Law 690, August 8, 1946
Patent expires November 3, 1962

8 Claims. (Cl. 18—54)

This invention relates to the formation of reaction products of unsaturated, high molecular weight rubbery polymers with inorganic acid compounds, and it is particularly concerned with the provision of materials useful in promoting or accelerating the formation of such products.

The term "high molecular weight unsaturated compounds," as employed herein, is intended to embrace compounds having a molecular weight of at least about 5,000 which are polymers of organic compounds containing a plurality of unsaturated linkages in the molecule, or which are copolymers of such compounds with other unsaturated organic compounds of one type or another. The term includes natural rubbers as well as unsaturated synthetic rubbers. It is contemplated that these various high molecular weight polymers may incorporate one or more of various modifying ingredients. as plasticizers, fillers, coloring agents, inflammability reducers, and the like.

High molecular weight polymers include polymerization products of butadiene and those of its homologues and derivatives, as, for example, methyl butadiene polymers, dimethyl butadiene polymers, pentadiene polymers, and chloroprene polymers (neoprene synthetic rubber).

Representative copolymers of high molecular weight which come within the term are those formed from butadiene, its homologues and derivatives with other unsaturated compounds. Among the latter are the olefins, as isobutylene which copolymerizes with butadiene to form butyl synthetic rubber; the vinyls, as vinyl chloride, acrylic acid, acrylonitrile (which polymerizes with butadiene to form the synthetic rubber Buna N), methacrylic acid, and styrene, the latter copolymerizing with butadiene to form the synthetic rubber Buna S; as well as the vinyl esters and various unsaturated aldehydes, ketones and ethers, as acrolein, methyl isopropenyl ketone, and vinyl ethyl ether.

The various forms of natural rubber and its unsaturated derivative compounds, including latex, crepe, sheet, caoutchouc, gutta percha, balata, and cyclo rubbers are also suitable unsaturated high molecular weight materials.

The above-defined, unsaturated high molecular weight materials may also be termed "multiple unsaturated, diene-derivative hydrocarbons of high molecular weight." Alternatively, these high molecular weight, polyunsaturated materials, including both natural and synthetic rubbers, may be defined as rubbery polymers of at least one compound selected from the group consisting of the conjugated diolefins and chloroprene.

The high molecular weight unsaturated compounds lend themselves well to the production of various shapes, including those of a continuous non-supported nature as filaments, rods, strips, sheets, and the like. In preparing continuous objects of this character, the normal practice is to dissolve the high molecular weight material in a solvent and to inject the resulting solution into a coagulating bath in which the high molecular weight compound is insoluble. Other objects can be produced by flowing the solution onto a support and there precipitating the solution through evaporation of the solvent. Processes of this nature are set forth in detail, for example, in U. S. Patents No. 2,185,656, issued January 2, 1940, No. 2,198,927, issued April 30, 1940, and No. 2,288 982, issued July 7, 1942, and reference is hereby made to the said patents for a disclosure of the methods described.

Even in the unformed condition the unsaturated high molecular weight compounds have a wide variety of uses, they being employed, for example, as constituents of many paints and varnishes.

It is known that improved results can generally be obtained if the unsaturated high molecular weight compounds employed are caused to react with one or more inorganic acidifying compounds. For example, the tensile strength of filaments and similar shapes is greatly enhanced as a result of such treatment, and at the same time their elongation when stressed to fracture is reduced. It should also be noted that as a result of treatment with the acidifying compound there is eliminated a certain amount of tackiness often present on the surface of objects newly formed from high molecular weight compounds, thereby increasing the ease with which the said objects may be handled.

As employed herein, the term "inorganic acidifying compound" embraces the various inorganic acids and acid anhydrides wherein the acid-forming element (as sulfur, nitrogen or phosphorus, for example), if possessing several valencies, is present in a valency other than the highest thereof. Suitable acidifying compounds are the acid anhydrides sulfur dioxide, phosphorus trioxide and nitrous trioxide, as well as the acids formed from these anhydrides. Other useful acidifying compounds are hydrogen sulfide, hydrochloric acid, hydrobromic acid, hydroiodic acid, and hydrofluoric acid. The term does not include such compounds as sulfur trioxide, phosphorus pentoxide, nitrogen pentoxide, or their corresponding acids, for in all these compounds the acid-forming element, which is here either sulfur, phosphorus or nitrogen, is present in the highest of several possible valencies.

While the exact nature of the reaction between unsaturated high molecular weight compounds and inorganic acidifying compounds is not clearly understood, a quantity of the acidifying ingredient is evidently taken up by the high molecular weight compound in one form or another. The extent of this reaction is normally measured by, and expressed in terms of, the amount of acid-forming element (sulfur, phosphorus or nitrogen, for example) present in the resulting reaction product. Whatever its nature, the reaction is an extremely slow one under normal conditions, and if materials of high purity be used, substantially no reaction at all occurs in most instances.

When making filaments and other continuous objects from high molecular weight compounds by extruding a solution thereof into a coagulating bath containing inorganic acidifying compound, it is of great importance that the reaction between the materials proceed as rapidly as possible, for the objects formed in the bath remain therein but a fraction of a second under normal operating conditions. Further, while it is important that the reaction proceed rapidly to its conclusion, the extent of the reaction should also be as great as possible, i. e., the unsaturated, high molecular weight compound should react with and retain relatively large amounts of inorganic acidifying compound. In many cases given physical properties can only be achieved when the acid portion of the reaction product reaches levels which could not heretofore be obtained on a commercial scale.

It is an object of the present invention to provide a method whereby reaction may be obtained between any of the materials classed as unsaturated high molecular weight polymers and those which are termed inorganic acidifying compounds. A more particular object is to provide a method whereby the time of such reaction may be greatly decreased. Still another object is to provide a method for increasing the magnitude of the reaction without lengthening the reaction time.

Other objects of the present invention will become apparent as the description proceeds.

It is our discovery that by treating the above-identified high molecular weight, polyunsaturated, rubbery polymers with a compound containing a hydroperoxide group (—OOH), the said polymers are thereby "activated" as regards their ability to react with sulfur dioxide or other inorganic acidifying compound. Representative exemplary hydroperoxides of this type are tetralin hydroperoxide (also known as tetralin peroxide) peracetic acid, perbenzoic acid, tertiary butyl hydroperoxide, hydrogen peroxide, persulfuric acid, percarbonic acid, and perboric acid, and of these compounds, it is preferred to use tetralin hydroperoxide. This activation of the polymer by the hydroperoxide compound takes place in but a short interval of time and is normally instantaneous, the resulting activated polymer then being capable of reacting at an exceedingly rapid rate with relatively large amounts of sulfur dioxide or other inorganic acidfying compound of the type described above.

In carrying out the activation process of this invention, the compound containing the hydroperoxide group may be mixed directly with the unsaturated polymer, though the preferred practice is to form a solution (which term also includes suspension) of the high molecular weight polymer and the hydroperoxide is then added thereto, the normal procedure being to select a solvent or dispersent for the polymer in which the particular hydroperoxide employed is also soluble. For example, butadiene polymer or natural rubber can be dissolved in an appropriate solvent such as dioxane or benzene, to which solution is added tetralin hydroperoxide as an activating agent for the dissolved polymeric ingredient. The resulting activation is achieved at room temperature and under normal atmospheric conditions, it being substantially completed in but a fraction of a second. The same remarks apply to other activation processes employing compounds containing a hydroperoxide group, though in the case of perbenzoic acid an activation period of several hours or even days is desirable if full effects are to be obtained.

Much the same result can also be achieved by treating with hydroperoxide those monomer compounds from which the unsaturated high molecular weight polymers are derived, as butadiene and pentadiene, or by treating partially formed high molecular weight polymers and copolymers. However, since it is the normal practice to employ the already formed high molecular weight polymers, reference will hereinafter be made only to the treatment thereof. Whatever the method by which the hydroperoxide is brought into effective engagement with the polymer, there is quickly obtained an activated material which is then capable of reacting at an exceedingly rapid rate with relatively large amounts of inorganic acidifying compound.

It is difficult to set particular limits on the relative proportions of high molecular weight, unsaturated polymer and hydroperoxide to be employed. For example, a quantity of as little as 0.1% by weight of tetralin hydroperoxide (based on the weight of unsaturated, high molecular weight compound present) will often serve to activate such materials as butadiene polymers and natural rubbers to such an extent that they will react with substantial quantities of sulfur dioxide or other acidifying compound. On the other hand, it is preferred that from about 1 to about 35% of the hydroperoxide activating agent be used, and particularly good results have been obtained with the addition of from about 15 to 17% thereof, these percentages again being expressed in terms of the weight of the unsaturated polymer present.

Unsaturated, high molecular weight rubbery polymers activated by treatment with hydroperoxides are well adapted to react with sulfur dioxide or other inorganic acidifying compounds. Despite the great variety of these polymers and the natural reluctance of many of them to combine with acidifying materials, the activation treatment here disclosed effectively imparts the desired reactive qualities to each compound. The conditions under which the reaction with acidifying compound takes place can be widely varied. If, for example, sulfur dioxide is introduced in either the gaseous, liquid or dissolved state into a solution of activated material, as butadiene polymer or natural rubber, a gel-like reaction product is obtained which can either be dried into a sheet or film, or be used in the liquid condition in finishes of one type or another. On the other hand, when solutions of the activated material are injected or otherwise introduced into a liquid bath containing available sulfur dioxide, as a solution of sulfur dioxide in a water-acohol mixture, there are precipitated the desired reaction products. Again, the reaction may take place when sulfur dioxide, in the gaseous, liquid or dissolved state is brought into contact with sheets or deposited layers of the activated material from which all solvent has not been evaporated.

It is also a feature of the present invention that when a quantity of an unsaturated high molecular weight compound not previously activated by a hydroperoxide is mixed with another unsaturated, high molecular weight compound which has been so activated, a mass is obtained all portions of which display the characteristics of the activated component. Even when amounts as low as 0.5% of the activated material are introduced, the resulting mixture as a whole will react quickly in some measure with the acidifying compound. However, when larger amounts of the activated component, as quantities in excess of about 5% thereof, are used, the mixture will react with larger amounts of the acidifying compound. For example, when plasticized natural rubber is admixed with polymerized butadiene previously activated with tetralin hydroperoxide, a mixture is obtained which is capable of instantly reacting with substantial quantities of sulfur dioxide. The sulfur content of the resulting product proves to be much greater than would be the case were the butadiene polymer to have been the sole sulfur dioxide-combining ingredient of the mixture.

The following examples illustrate the present invention in various of its embodiments:

*Example I*

A 6% solution of plasticized natural rubber was prepared using benzene as solvent, and to this solution was added 15%, as referred to the weight of rubber present, of tetralin hydroperoxide. A coagulated rubber film was immediately prepared from the solution using the object glass technique, and with a coagulating bath (ethyl alcohol-water, 4:1) maintained at 0° C. and containing 400 g. of sulfur dioxide per liter. The object glass technique here referred to consisted in immersing a clean object glass in the polymer solution for 5 seconds, letting the liquid drip off the glass as the latter was held in the vertical position for 5 seconds, dipping the glass into the coagulation bath for 60 seconds, washing the resulting coagulated film with water, and then forming the film into pellets which were dried at low temperature in vacuum. The pellets here obtained contained 16% by weight sulfur. For the sake of comparison, a film was prepared from the same 6% benzolic solution of plasticized natural rubber, but without the addition of tetralin hydroperoxide. Pellets produced from this solution contained but 0.1% by weight sulfur.

The instantaneous and highly effective activation of the polymer achieved by the addition of tetralin hydroperoxide, as described in the foregoing example, is characteristic of the other hydroperoxides as well. This behavior contrasts sharply with that of peroxides such as benzoyl peroxide, acetyl peroxide and the like, which compounds are free of any hydroperoxide group, for while such peroxides are capable of activating the high molecular weight polymers, the activation process is much slower and normally requires a period of from several hours to two or more months. This extended activation time is a serious drawback, particularly when activating solutions of rubber, butadiene polymer, or other rubber-like polymers which are to be spun into filament form. This is true not only because of the added expense incident to storing the polymer solutions during the activation process, but also because the resultant solutions would in many cases vary from lot to lot depending on the degree of activation achieved, and it would therefore be impossible to obtain fibers of uniform quality. On the other hand, when the polymeric starting material is activated with a hydroperoxide, the resulting product may then be spun immediately into the coagulating bath, though an intermediate storage period may intervene; in either event, the quality of the activated polymer, as measured by its capacity to react with sulfur dioxide or other inorganic acidifying compounds during the short period in which the filaments remain in the coagulating bath, is the same. This distinction is borne out by the process described in Example II to follow, wherein benzoyl peroxide is employed as the activating agent.

*Example II*

A 6% solution of butadiene polymer (mean molecular weight about 50,000) was prepared using dioxane as the solvent. The solution was then divided into 3 parts. To the first part was added 1.6% benzoyl peroxide and to the second par 16% benzoyl peroxide, these percentages being based on the weight of polymer present. No peroxide was added to the third part of the solution. All three solution portions were then kept in the dark at room temperatures under a nitrogen atmosphere, and at intervals coagulation tests were made with small quantities of each of the solutions. The coagulating bath employed consisted of ethyl alcohol and water (4:1 by volume) saturated at room temperature with sulfur dioxide. These tests were carried out by means of the object glass technique described in Example I above. The first such test was made at the end of a storage period of 24 days. The polymer solution without peroxide yielded a film containing 0.2% by weight sulfur; that with 1.6% peroxide a film having 2.6% by weight sulfur; and that with 16% peroxide a film having 7.6% by weight sulfur. At the end of a 69 day storage period, the sulfur content of the film produced from the peroxide-free solution had not increased, though that of the films produced from the solutions containing 1.6% and 16% benzoyl peroxide had increased to 5.4% and 9.2% by weight, respectively. From this it is seen that when using peroxides which are free of hydroperoxide groups, not only is it necessary to employ an extended activation period (here over two months), but the finally activated product still does not have the same capacity to react with sulfur dioxide as does a rubbery polymer starting material activated in a substantially instantaneous manner by the addition of an amount of hydroperoxide equivalent to the amount of benzoyl peroxide employed in this present example.

*Example III*

A 6% solution of butadiene polymer (mean molecular weight 50,000) was prepared using benzene as solvent. To this solution was added a quantity of peracetic acid equivalent to about 50% of the weight of polymer present. Immediately after the addition of the peracetic acid, a film was formed using the object glass technique described in Example I. The resulting film contained 2.4% by weight sulfur. This is another example of the substantially instantaneous activation of the rubbery polymeric starting material obtained by using a compound containing a hydroperoxide group.

*Example IV*

A solution was prepared containing 3% masticated natural rubber in a benzene solvent. To one part of this solution was added a quantity of tetralin hydroperoxide equivalent to about 1% of the weight of rubber present. The resulting solution was immediately spun into a coagulating bath made up of ethyl alcohol and water (4:1) maintained at 0° C. and containing 100 g. sulfur dioxide per liter. The resulting filaments, when dried, contained 1.4% by weight sulfur.

Another portion of the solution was activated through addition of approximately 5% (calculated on rubber) tetralin hydroperoxide. This solution also was spun immediately into a coagulating bath of the same composition as described in the preceding paragraph. The filaments so produced, then dried, contained 8.7% by weight sulfur.

To still another part of the benzolic rubber solution was added 25% (calculated on rubber) tetralin hydroperoxide. On being spun without delay into the coagulating bath described above, filaments were obtained which contained 11.4% by weight sulfur.

The invention claimed is:

1. In a process for producing filaments, the steps comprising forming a solution of a rubbery polymer of a compound selected from the group consisting of conjugated diolefins and chloroprene; adding to said solution a compound containing a hydroperoxide group; and thereafter extruding the resulting solution into a coagulating bath containing available sulfur dioxide, the extruded rubbery polymer there reacting with the sulfur dioxide to form an insoluble, filamentary reaction product.

2. In a process for producing filaments, the steps comprising forming a solution of a rubbery polymer of a compound selected from the group consisting of conjugated diolefins and chloroprene; adding to said solution a quantity of tetralin hydroperoxide equivalent to at least 1% by weight of the amount of polymer present in the solution; and thereafter extruding the solution into a coagulating bath containing available sulfur dioxide, the extruded rubbery polymer there reacting with the sulfur dioxide to form an insoluble, filamentary reaction product.

3. In a process for producing filaments, the steps comprising forming a solution of a natural rubber; adding to said solution a compound containing a hydroperoxide group; and thereafter extruding said solution into a coagulating bath containing available sulfur dioxide, the extruded rubber there reacting with the sulfur dioxide to form an insoluble, filamentary reaction product.

4. In a process for producing filaments, the steps comprising forming a solution of a natural rubber; adding to said solution a quantity of tetralin hydroperoxide equivalent to at least 1% by weight of the amount of rubber present in the solution; and thereafter extruding the solution into a coagulating bath containing available sulfur dioxide, the extruded dissolved rubber there reacting with the sulfur dioxide to form an insoluble, filamentary reaction product.

5. In a process for producing filaments, the steps comprising forming a solution of a synthetic, rubbery, butadiene polymer; adding to said solution a compound containing a hydroperoxide group; and thereafter extruding said solution into a coagulating bath containing available sulfur dioxide, the extruded polymer there reacting with the sulfur dioxide to form an insoluble, filamentary reaction product.

6. In a process for producing filaments, the steps comprising forming a solution of a synthetic, rubbery, butadiene polymer; adding to said solution a quantity of tetralin hydroperoxide equivalent to at least 1% by weight of the amount of polymer present in the solution; and thereafter extruding said solution into a coagulating bath containing available sulfur dioxide, the extruded polymer there reacting with the sulfur dioxide to form an insoluble, filamentary reaction product.

7. The method of rapidly improving the reactivity towards sulfur dioxide of a rubbery polymer of a compound selected from the group consisting of conjugated diolefins and chloroprene, said method comprising mixing with said polymer a compound containing a hydroperoxide group.

8. The method of rapidly improving the reactivity towards sulfur dioxide of a rubbery polymer of a compound selected from the group consisting of conjugated diolefins and chloroprene, said method comprising mixing with said polymer a quantity of tetralin hydroperoxide.

GOTTFRIED ERNST RUMSCHEIDT.
WILLEM LEENDERT JOHANNES DE NIE.

REFERENCES CITED

The following references are of record in the file of this patent:

UNITED STATES PATENTS

| Number | Name | Date |
|---|---|---|
| 1,925,879 | Oenslager | Sept. 5, 1933 |
| 2,265,722 | de Nie | Dec. 9, 1941 |

OTHER REFERENCES

Union Bay State, Chemical Industries, 55 page 265 (Aug. 1944).

Certificate of Correction

Patent No. 2,469,847.  May 10, 1949.

GOTTFRIED ERNST RUMSCHEIDT ET AL.

It is hereby certified that errors appear in the printed specification of the above numbered patent requiring correction as follows:

Column 5, line 4, for "water-acohol" read *water-alcohol*; column 7, line 42, claim 1, for "hydroperozide" read *hydroperoxide*;

and that the said Letters Patent should be read with these corrections therein that the same may conform to the record of the case in the Patent Office.

Signed and sealed this 15th day of November, A. D. 1949.

[SEAL]

THOMAS F. MURPHY,
*Assistant Commissioner of Patents.*